United States Patent
Mitchell et al.

(10) Patent No.: US 6,928,183 B2
(45) Date of Patent: Aug. 9, 2005

(54) SYSTEM FOR AND METHOD OF READING MICR USING HIGH AND LOW GAIN SIGNALS

(75) Inventors: John G. Mitchell, Ovid, NY (US);
William M. Schmid, Auburn, NY (US);
Terrence J. Campbell, Ithaca, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 582 days.

(21) Appl. No.: 09/949,469

(22) Filed: Sep. 10, 2001

(65) Prior Publication Data

US 2005/0074159 A1 Apr. 7, 2005

(51) Int. Cl.[7] ............................................. G06K 9/20
(52) U.S. Cl. ..................................... 382/139; 382/320
(58) Field of Search ................................ 382/139, 182, 382/183, 320, 137; 235/449

(56) References Cited

U.S. PATENT DOCUMENTS

| | | | |
|---|---|---|---|
| 3,868,635 A | * 2/1975 | Shah et al. | 340/146.3 MA |
| 3,938,089 A | 2/1976 | McGregor et al. | 340/146.3 D |
| 4,080,528 A | * 3/1978 | Kao et al. | 235/449 |
| 4,148,010 A | * 4/1979 | Shiau | 340/146.3 C |
| 4,246,473 A | 1/1981 | Maussion | 235/449 |

* cited by examiner

Primary Examiner—Andrew W. Johns
(74) Attorney, Agent, or Firm—George R. McGuire; Bond, Schoeneck & King, PLLC (57) ABSTRACT

Commercial establishments that add MICR indicia to commercial instruments usually do so via laser printers that produce a high gain signal. Moreover, commercially printed documents that include MICR indicia can also result in a high gain signal. MICR indicia generated by laser printers are difficult to decode, using conventional DC biasing methods, because the laser-generated MICR high gain signals become clipped. Therefore, in order to decode these distorted signals, the present system processes both low and high gain signals to decode the raw MICR data.

16 Claims, 7 Drawing Sheets

SYSTEM FOR AND METHOD OF READING MICR USING HIGH AND LOW GAIN SIGNALS

FIELD OF THE INVENTION

The present invention relates to magnetic ink character recognition (MICR) reading techniques and, more particularly, to an enhanced MICR reading method that reads MICR characters at two different signal levels.

BACKGROUND OF THE INVENTION

MICR characters are generally printed on checks by commercial check printers, generally including bank routing, account identification and serial numberings. Banks can append this printed information with the amount field. Historically, most MICR characters were printed by offset printing methods using magnetic ink. Today, laser or ion-deposition methods are increasingly being used, by both commercial printers and financial institutions, for writing MICR encoded information.

The MICR encoded information is usually decoded by detecting one of two different magnetic properties of the magnetizable ink: remanance and permeability. The remanance method involves sensing weak voltage signals while scanning MICR character shapes that have been previously magnetized. The second decoding method, also known as the DC-bias method, involves detecting the changes in permeability presented by the MICR character shapes as these character shapes are scanned by the detector.

Trying to read laser-generated indicia using DC biasing techniques has become problematical. Such laser-generated indicia are subject to waveform corruption. That is, the high amplitude, laser-printed MICR signal is subject to clipping.

In order to provide a more foolproof method of reading all types of MICR, the present invention reflects the discovery of a decoding technique that reads MICR signals at two different signal levels: at both high and low gain levels. This improvement allows decoding of large and small signal amplitudes without distortion and clipping.

A "bad read" is a decode that contains a rejected character indicator within the decode string. This rejected character indicator represents raw MICR data that the decoder circuitry was unable to recognize as a valid MICR character. A second MICR read often correctly reads a MICR character rejected on the first pass. In addition to ensuring accurate decoding performance, the inventive method includes apparatus that may be configured to perform a dual pass MICR read. This is possible because the document transport of the printer still has control of the check or other MICR encoded document when it is determined that the initial MICR read was unsuccessful (i.e., when a bad read occurred).

SUMMARY OF THE INVENTION

In accordance with the present invention, there is provided a system for reading or otherwise decoding MICR indicia disposed upon commercial instruments. MICR characters deposited upon checks by banks and MICR document printers can usually be decoded easily, due to their low amplitude signal. However, commercial establishments that add MICR indicia usually do so by using laser printers that can produce a high amplitude signal. MICR indicia generated by laser printers are difficult to decode, via conventional DC biasing methods, because laser-generated MICR high amplitude signals can become clipped. Therefore, in order to decode these distorted signals, the present system comprises a method to capture both high and low gain MICR signals. The MICR signals are input into an analog to digital (A/D) converter, which transforms the analog MICR signal into raw MICR data in numerical form. In addition, when a bad read is detected, a second MICR read may be performed in an attempt to achieve a good MICR read.

It is an object of the present invention to provide an improved MICR reader/decoder.

It is another object of this invention to provide a MICR reading/decoding system that processes both high and low gain signals.

It is a still further object of the invention to provide a MICR reading/decoding system wherein a second MICR read may be performed when one or more MICR characters are incorrectly read during a first MICR read.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the present invention features an improved system for reading and decoding MICR indicia. MICR characters deposited upon checks by banks and commercial document printers can usually be decoded easily due to their low amplitude signal. However, commercial establishments that add MICR indicia often do so by using laser printers that produce a high amplitude signal. MICR indicia generated by laser printers can be difficult to decode, via conventional DC biasing methods, because the laser-generated MICR high gain signals can become clipped. Therefore, in order to decode these distorted signals, the present system captures both low and high gain MICR data signals.

Figure 1:
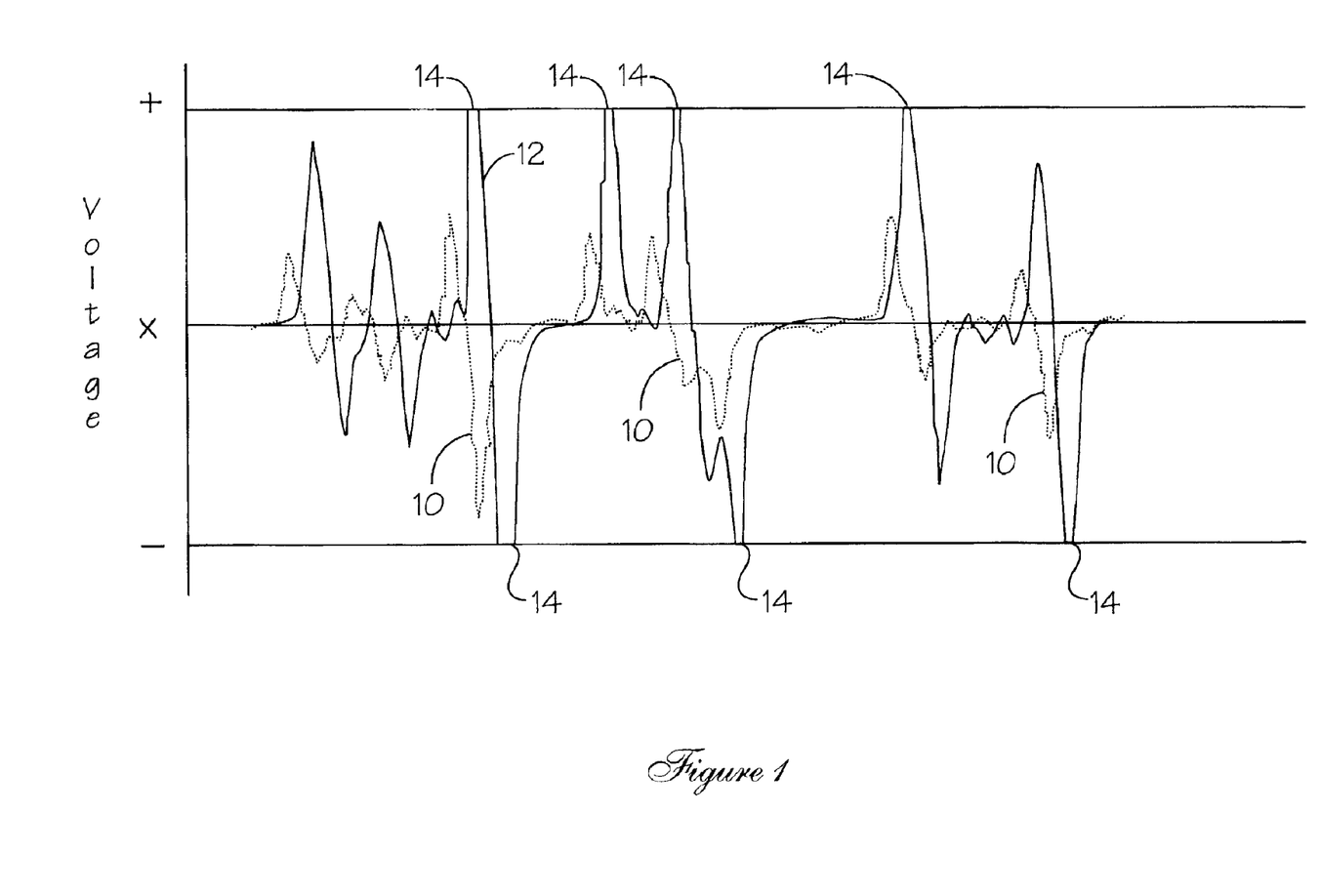
FIG. 1 illustrates a typical graphical display of low and high gain MICR signals, with the high gain MICR signals being clipped by DC bias detection.

Now referring to FIG. 1, a graphical representation is shown of typical MICR signals generated by different MICR printers. One of the printed MICR characters has generated the low amplitude signal 10, and the other MICR (laser printed) character has generated the high gain signal 12. In this case, the detection of these MICR signals was accomplished by using a conventional DC bias technique. Utilizing the DC bias method, however, clips or otherwise distorts the peaks 14 of the high gain signals 12. The DC bias decoding method, therefore, is unable to decode the high gain signals accurately.

Figure 2:
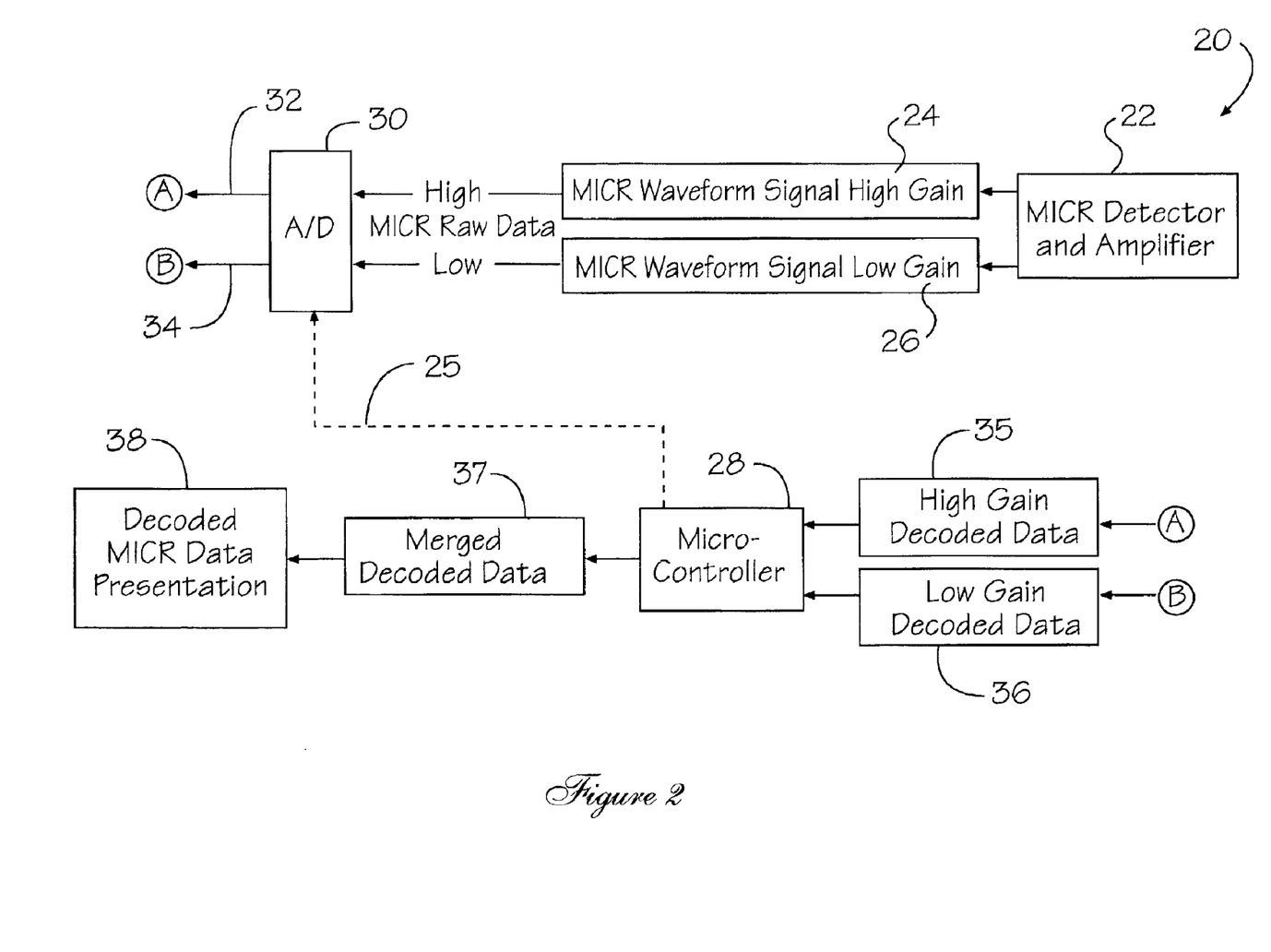
FIG. 2 depicts a block diagram of the decoding system of this invention.

Referring to FIG. 2, the MICR data collection and decoding system 20 of this invention is illustrated. The decoding system 20 uses a MICR detector and amplifier 22 to provide both the high gain signal 24 and the low gain signal 26. Under control (dashed line 25) of a micro-controller 28, an A/D converter 30 digitizes the high and low gain analog waveform signals and then decodes the signal data into respective high and low gain decoded data buffer arrays 35 and 36, respectively. At the same time that the signal data 32 and 34 is being stored in the data buffer arrays 35 and 36, the micro-controller 28 also stores the spatial MICR character position index and a flag indicator signifying, on a character-by-character basis, whether waveform clipping (truncating or otherwise distorting) occurred.

Finally, the micro-controller 28 polls each character in sequence from the high gain decoded buffer array 35. If the polled character was a legitimate MICR character, it is stored in its respective position sequence in a merged decoded data buffer 37. If the polled character was not a legitimate MICR character, and if there was no indication that this particular character had a clipped waveform, however, then this character is represented by an error character. If the polled character from the high gain decoded data buffer array 35 was not a legitimate MICR character, and if there was indication that this character did have a clipped waveform, then the micro-controller 28 searches for the nearest character in the low gain decoded data buffer array 36 that corresponds to the spatial position index value. If this character is a legitimate MICR character, then this character is inserted into the respective position in the merged decoded data buffer 37.

After all of the characters have been sequenced out of the high gain decoded data array 35, the micro-controller 28 transmits the emerged decoded data 38 on appropriate command.

Figure 3:
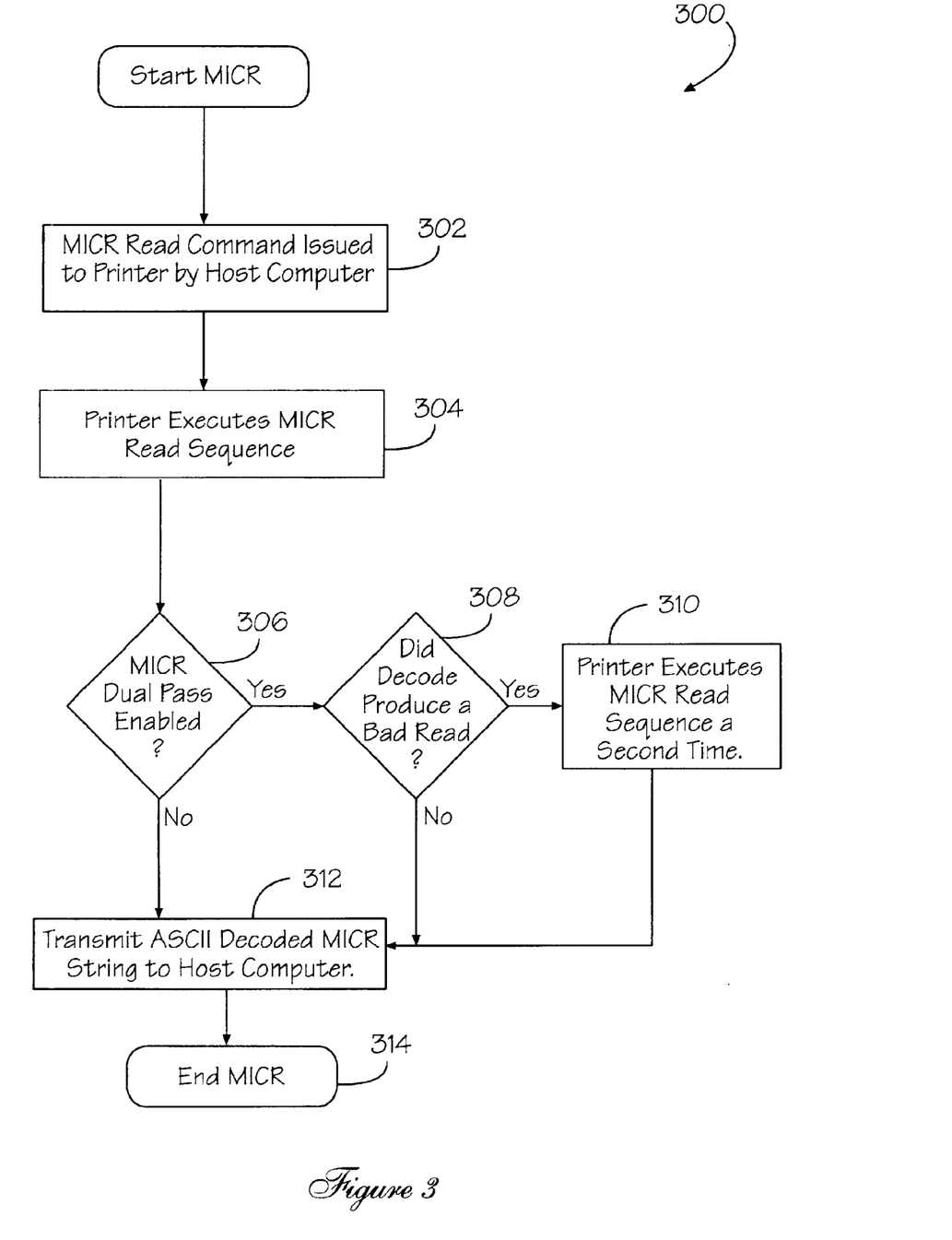
FIG. 3 is a high-level flow chart of the MICR read operation.

The MICR read operation may be summarized by referring now to FIG. 3, where a high-level flow chart 300 is provided. The MICR operation begins with a MICR read command being issued to the MICR-equipped printer by the host computer, step 302. The printer then executes the MICR read command, step 304. The details of the MICR read command execution are described in detail hereinbelow. If the MICR dual read mode has been enabled, step 306, the decoded output from the MICR reader is checked to see if a bad read was detected, step 308. If a bad read is detected, step 308, the MICR read sequence is performed a second time, step 310. Upon completion of the second MICR read sequence, step 310, the decoded output is transmitted as an ASCII string to the host, step 312, and the MICR sequence terminates, step 314. If, however, a bad read is not detected, step 308, the decoded output is directly transmitted as an ASCII string to the host, step 312, and the MICR sequence terminates, step 314.

If the MICR dual pass feature is not enabled, step 306, the decoded output is transmitted as an ASCII string directly to the host, step 312 and the MICR sequence terminates, step 314.

Figure 4A:
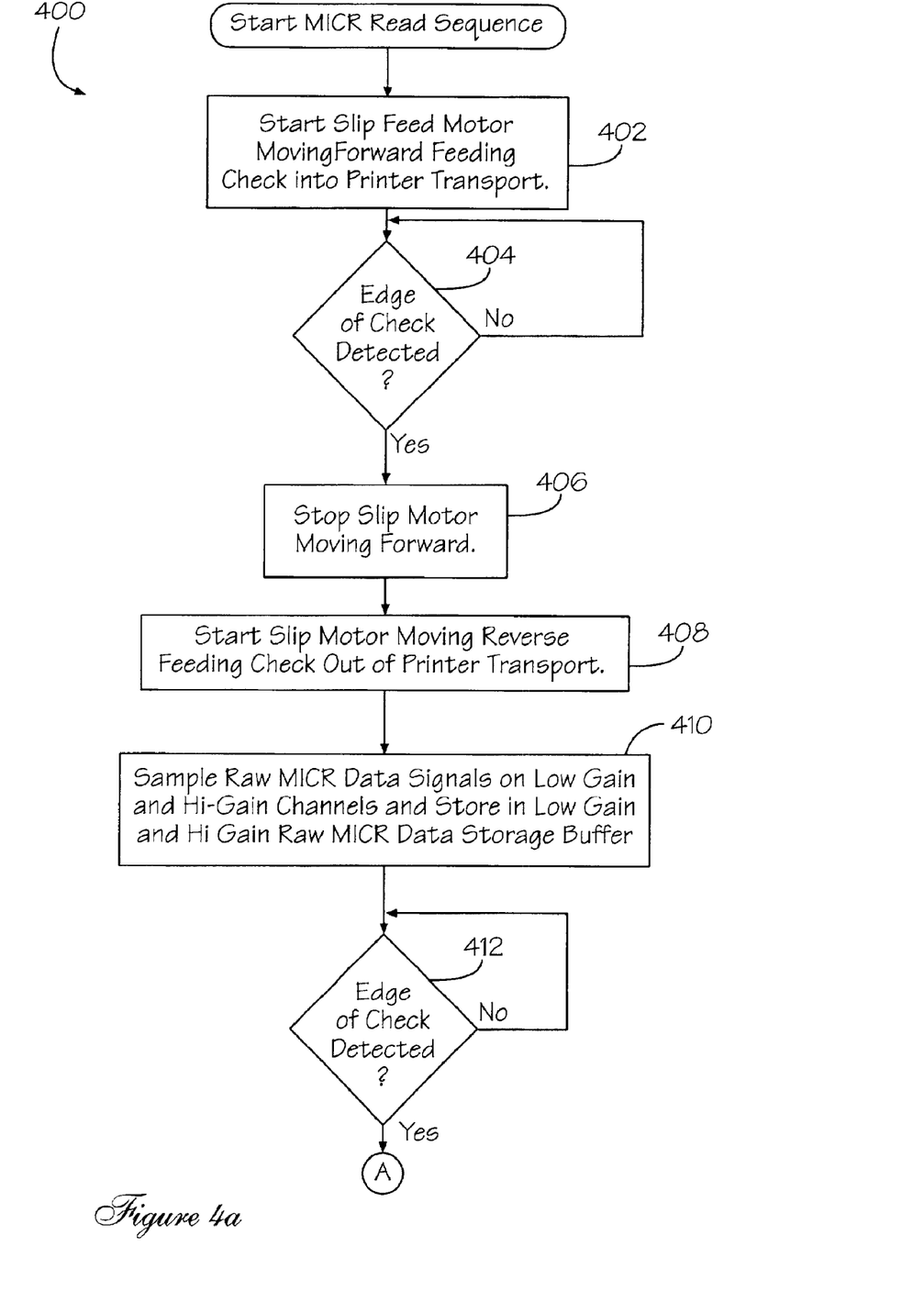
FIGS. 4a–4c, taken together, represent a flow chart of the actual MICR read operation.
Figure 4B:
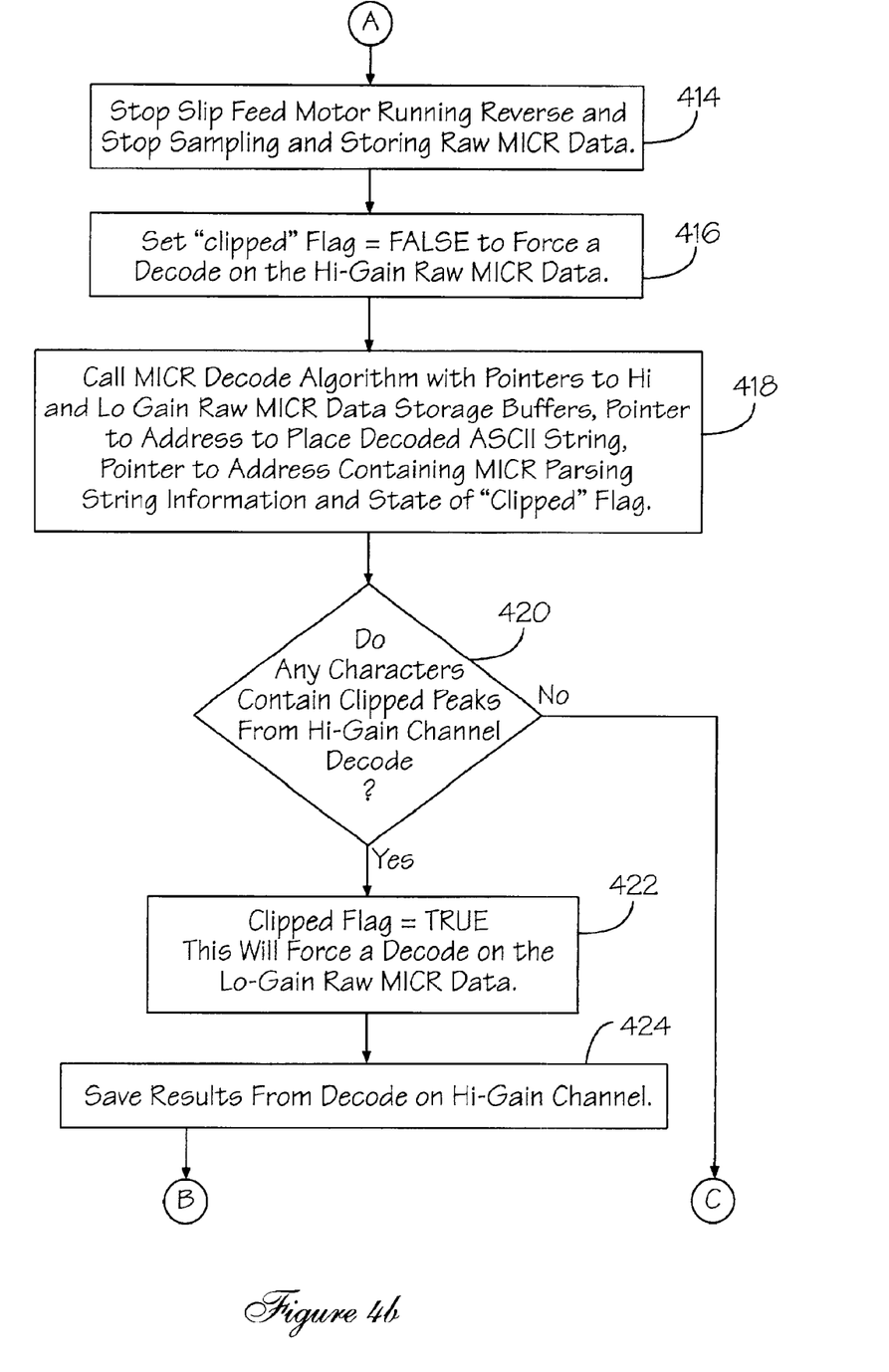
Figure 4C:
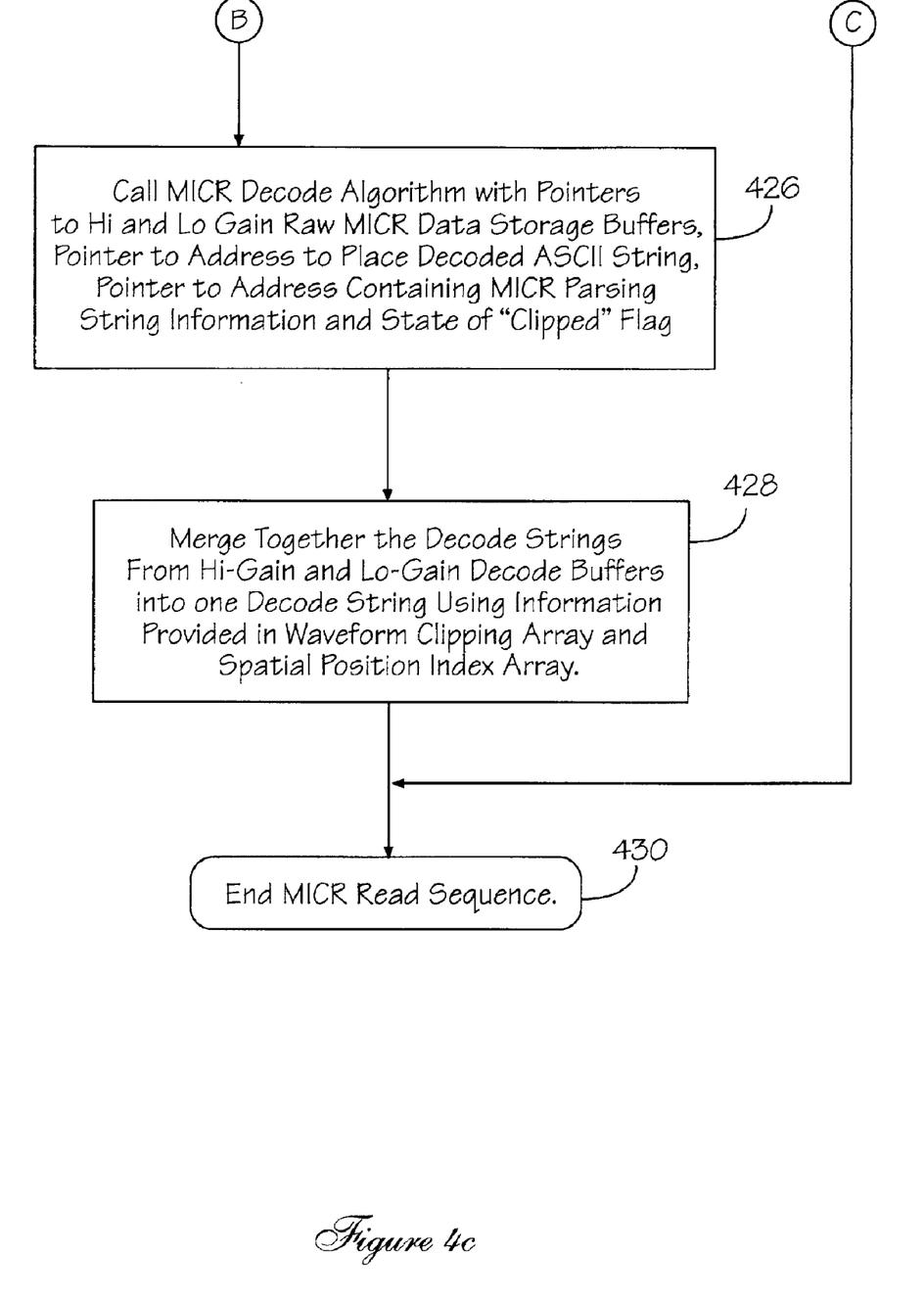

Referring now to FIGS. 4a–4c, the flow chart of the MICR read sequence 400 is provided. The printer slip feed motor is started and the check or other MICR-encoded document is forward fed into the printer, step 402. When the edge of the check is detected, step 404, the forward motion of the slip motor is stopped, step 406. The direction of the slip motor is reversed and the check is moved backward out of the transport, step 408. While the check is being fed backward out of the transport, step 408, several operations are performed. Raw MICR data from both the high-gain and the low-gain channels are sampled. Both the high-gain and the low-gain raw data are stored in the high-gain and the low-gain storage buffers, respectively, step 410. When the edge of the check is detected, step 412, the slip feed motor is stopped and data sampling and storage are terminated, step 414. The clipped flag is set false, step 416, to force a decode of the high-gain MICR raw data. The MICR decode routine is performed, step 418, with pointers to both the high-gain and low-gain storage buffers, a pointer to an address where decoded data is to be stored, a pointer to an address where MICR parsing data is stored, and the state of the clipped flag. Details of the operation of the decode routing are provided herein below.

After data is returned from the decode operation, step 418, the returned data is inspected for clipped peaks from the high-gain channel. If clipped peaks are found, step 420, the clipped flag is set true, step 422. This forces a decode of the low-gain channel. The results from the high-gain decode are saved, step 424, and the decode routine is again called, step 426. After the completion of the low-gain decode, step 424, the results of both the high-gain decode and the low-gain decode operations are merged, step 428. The MICR sequence is completed, step 430.

If, however, the results of the high-gain decode, step 418, do not contain clipped characters, step 420, the MICR sequence is terminated, step 430.

Figure 5:
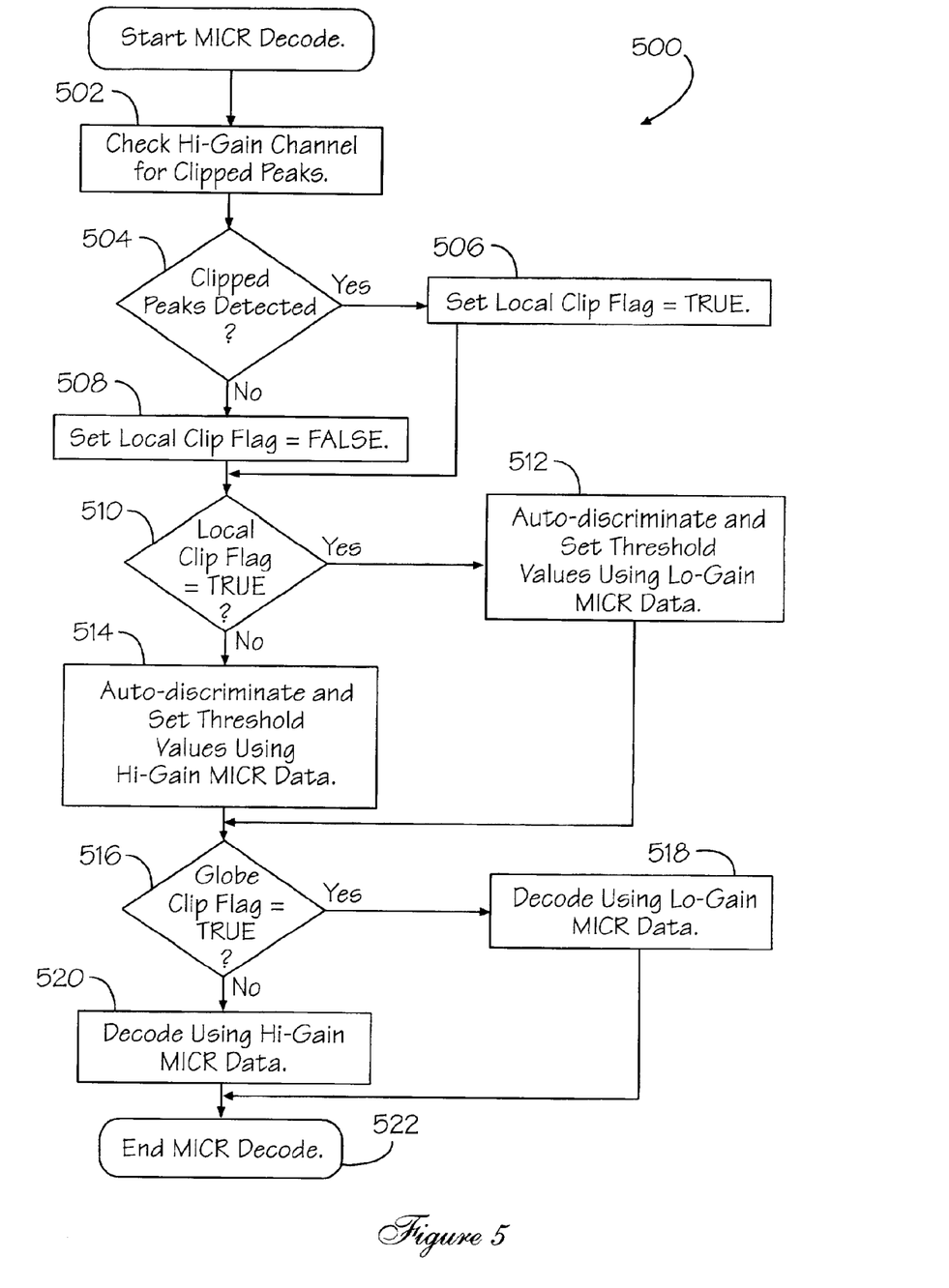
FIG. 5 is a flow chart of the MICR decode operation.

Referring now to FIG. 5, there is shown a flow chart 500 of the MICR decode routine. First, upon completion of the MICR read, the data from the high-gain channel is checked for clipped peaks, step 502. If clipped peaks are detected, step 504, the local clip flag is set true, step 506. If, however, no clipped peaks are detected, step 504, then the local clip flag is set false, step 508. If the local clip flag is true, step 510, an auto-discrimination operation is performed and threshold values are set using MICR data from the low-gain channel, step 512. If, however, the local clip flag is false, step 510, the threshold values are set using MICR data from the high-gain channel, step 514. If the global clip flag is true, step 516, then decoding is performed using the low-gain MICR data, step 518. If, however, the global clip flag is false, decoding is performed using the high-gain MICR data, step 520. Once decoding is complete, steps 518 or 520, the decode routine terminates and the decoded data is passed back to the calling MICR routine, step 522.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for decoding MICR data, the steps comprising:
   a) detecting MICR signal waveforms containing both low and high gain signals;
   b) digitizing said MICR signal waveforms;
   c) decoding said digitized signals into respective low gain and high gain data components;
   d) storing said low gain and high gain components; and
   e) presenting said decoded data components.

2. The method for decoding MICR data in accordance with claim 1, wherein said storing step (d) comprises storing said low gain and high gain data components in respective storage arrays.

3. The method for decoding MICR data in accordance with claim 2, wherein said detecting step (a) further comprises the substep of amplifying said MICR signal waveforms.

4. The method for decoding MICR data in accordance with claim 3, the steps further comprising:
   f) merging and storing in a merged decoded data buffer, said data representative of said low gain and high gain data components prior to performing said presenting step (e).

5. The method for decoding MICR data in accordance with claim 4, the steps further comprising:
   g) determining whether any of said MICR signal waveforms are clipped.

6. The method for decoding MICR data in accordance with claim 5, the steps further comprising:
   h) storing a spatial MICR character position index for said clipped MICR signal waveforms.

7. The method for decoding MICR data in accordance with claim 6, the steps further comprising:
   i) searching said low gain storage array for the nearest character to said at least one MICR character, in accordance with said spatial MICR character position index; and
   j) inserting said nearest character in said merged decoded data buffer.

8. The method for decoding MICR data in accordance with claim 5, the steps further comprising:
   h) polling data stored in said high gain storage array, representative of at least one MICR character, to determine whether said high gain decoded data component corresponding to said at least one MICR character indicates that said MICR character is not legitimate and that said corresponding signal waveform is clipped.

9. The method for decoding MICR data in accordance with claim 8, wherein said polling step (h) is performed sequentially.

10. The method for decoding MICR data in accordance with claim 8, wherein at least a sub-set of steps (a) through (h) are performed at least one additional time in response to detection of said non-legitimate MICR character.

11. A system for decoding MICR indicia, comprising:
    reading means for generating signals representing both high gain and low gain MICR indicia;
    a micro-controller operatively connected to said reading means for processing said high gain signals independently from said low gains signals; and
    an analog-to-digital converter, connected to said micro controller, for converting both said high gain signals and said low gain signals to digital information.

12. The system for decoding MICR characters in accordance with claim 11, wherein said reading means comprises a detector and an amplifier.

13. The system for decoding MICR characters in accordance with claim 12, further comprising a high gain decoded data array and a low gain decoded data array for storing digital data representative of said high gain and low gain MICR indicia, respectively.

14. The system for decoding MICR characters in accordance with claim 13, further comprising decoded data merging means operatively connected to said micro-controller.

15. The system for decoding MICR characters in accordance with claim 14, further comprising means, operatively connected to said micro-controller, for storing a spatial MICR character position index.

16. The system for decoding MICR characters in accordance with claim 14, further comprising means for repeating at least a portion of a MICR read operation responsive to detection of an illegitimate MICR character.

* * * * *